(12) United States Patent
Shiokawa et al.

(10) Patent No.: US 7,205,055 B2
(45) Date of Patent: Apr. 17, 2007

(54) HIGH TEMPERATURE OXIDATION RESISTANT CARBONACEOUS MOLDING AND MANUFACTURING METHOD THEREOF

(75) Inventors: Makoto Shiokawa, Saitama (JP); Naoki Hiromasa, Saitama (JP); Kaoru Kusano, Fukushima (JP); Toru Tadokoro, Fukushima (JP)

(73) Assignee: Honda Motor Co., Ltd., Tokyo (JP)

(*) Notice: Subject to any disclaimer, the term of this patent is extended or adjusted under 35 U.S.C. 154(b) by 458 days.

(21) Appl. No.: 10/755,462

(22) Filed: Jan. 13, 2004

(65) Prior Publication Data

US 2005/0153125 A1    Jul. 14, 2005

(51) Int. Cl.
*B32B 9/00* (2006.01)

(52) U.S. Cl. .................................................. 428/698

(58) Field of Classification Search ............... 428/698, 428/701, 408
See application file for complete search history.

(56) References Cited

U.S. PATENT DOCUMENTS

| | | | |
|---|---|---|---|
| 3,348,967 A | 10/1967 | Hucke | |
| 4,863,773 A | 9/1989 | Rousseau et al. | 428/68 |
| 5,418,012 A * | 5/1995 | Kung | |
| 5,955,197 A | 9/1999 | Skowronski et al. | 428/408 |

FOREIGN PATENT DOCUMENTS

| | | |
|---|---|---|
| EP | 1 188 731 A2 | 3/2002 |
| JP | 54-110221 A | 8/1979 |
| JP | 4-280955 | 10/1992 |
| JP | 9-301786 | 11/1997 |

\* cited by examiner

*Primary Examiner*—Jennifer McNeil
*Assistant Examiner*—Daniel Miller
(74) *Attorney, Agent, or Firm*—Arent Fox LLP

(57) ABSTRACT

A high temperature oxidation resistant carbonaceous molding having a parent material containing carbon, a metallic carbide containing layer which is formed such that a metal is diffused to a surface of the parent material and metal carbide is formed thereon and having cracks, a vitreous member composed of a vitreous material filled in the cracks and a vitreous material layer formed on a surface of the metallic carbide containing layer, wherein the vitreous member and the vitreous material layer are integrated.

4 Claims, 2 Drawing Sheets

HIGH TEMPERATURE OXIDATION RESISTANT CARBONACEOUS MOLDING AND MANUFACTURING METHOD THEREOF

BACKGROUND OF THE INVENTION

1. Field of the Invention

The present invention relates to a high temperature oxidation resistant carbonaceous molding for use in an oxidizing atmosphere and its manufacturing method, and more particularly to a high temperature oxidation resistant carbonaceous molding suitably used under the environments where high and low temperatures are repeated, and its manufacturing method.

2. Description of the Related Art

A carbon material has a greater strength than a metal material in a non-oxidizing atmosphere at high temperatures, but easily burns in an oxidizing atmosphere such as the atmospheric air, as well known. Accordingly, if the surface of carbon material is covered with a heat resistant material to shut off oxygen, the carbon material brings out its proper strength in the oxidizing atmosphere at high temperatures.

Conventionally, a carbonaceous molding has been known in which the oxidation resistance is increased by covering the surface of carbon material with a vitreous material to shut off oxygen (e.g., Published Japanese Patent Application JP-A-9-301786 page 4, right column, 36th line to page 6, right column, 9th line). However, since a vitreous material molten at high temperature has a poor wettability to carbon material, the surface of this carbonaceous material is not uniformly covered with vitreous material. Particularly, if this carbonaceous molding is employed under the environments where high and low temperatures are repeated, the vitreous material is detached from the carbon material, so that the carbon material is exposed to the oxidizing atmosphere.

Also, conventionally, there is well known a method for forming a chromium diffusion layer on the surface of a workpiece through the chromising treatment (e.g., Published Japanese Patent Application JP-A-4-280955 page3, left column, 35th to 39th line). This chromising treatment involves contacting the workpiece with, for example, a metal penetrant containing metal chromium powder, halide and a sintering inhibitor, and heating them in a ventilating current of hydrogen gas to diffuse chromium into the workpiece. In this chromising treatment, a vapor of chromium halide produced by reaction between metal chromium and halide is reduced on the surface of the workpiece by hydrogen gas and becomes fine metal chromium of high purity. And metal chromium deposited on the surface of the workpiece is diffused into the workpiece, so that a chromium diffusion layer is formed on the surface of the workpiece.

If the chromising treatment is applied to carbon material, the chromium diffusion layer superior in the heat resistance containing chromium carbide ($Cr_{23}C_6$) produced by bonding between carbon and diffused metal chromium is formed on the surface of carbon material. This chromium diffusion layer has a more excellent wettability to vitreous material at high temperatures than carbon material, whereby the vitreous material layer is uniformly formed on the surface of the chromium diffusion layer. Accordingly, if the chromium diffusion layer and the vitreous material layer are employed to shut off oxygen, it may be possible to add the high oxidation resistance to carbon material.

However, if the carbon material is subjected to the conventional chromising treatment, the carbon material and hydrogen gas are reacted to produce hydrocarbon, so that the carbon material of a base material is consumed. As a result, the chromium diffusion layer formed on the surface of carbon material is likely to be peeled. Accordingly, the carbonaceous molding with the vitreous material layer covered on the chromium diffusion layer is not suit for use under the environments where high and lower temperatures are repeated.

SUMMARY OF THE INVENTION

It is an object of this invention to provide a high temperature oxidation resistant carbonaceous molding that is excellent in the oxidation resistance even if it is used under the environments where high and low temperatures are repeated.

The present inventors have achieved this invention to solve the above-mentioned problems by finding that cracks are generated in the metal diffusion layer by a method of using no hydrogen gas and capable of producing metallic carbide in the metal diffusion layer at a higher content ratio than the conventional method, and the vitreous material layer is strongly bonded on the metal diffusion layer using the cracks.

To accomplish the above object, according to a first aspect of the invention, there is provided a high temperature oxidation resistant carbonaceous molding comprising a parent material containing carbon, a metallic carbide containing layer which is formed such that a metal is diffused to a surface of the parent material and metal carbide is formed thereon, having cracks, a vitreous member composed of a vitreous material filled in the cracks and a vitreous material layer formed on a surface of the metallic carbide containing layer, wherein the vitreous member and the vitreous material layer are integrated.

According to the high temperature oxidation resistant carbonaceous molding of the present invention, the parent material containing carbon is covered with the vitreous material layer via the metallic carbide containing layer, and does not contact with oxygen. Accordingly, even if the high temperature oxidation resistant carbonaceous molding is exposed to the oxidizing atmosphere at high temperatures, the parent material does not burn. Also, the vitreous member composed of the vitreous material is filled in the cracks formed in the metallic carbide containing layer, in which the vitreous member and the vitreous material layer are integrated. Accordingly, the vitreous material layer is strongly bonded on the surface of the metallic carbide containing layer due to an anchor effect of the vitreous member, so that the vitreous material layer is not peeled from the metallic carbide containing layer.

Also, in this high temperature oxidation resistant carbonaceous molding, when heated, the width of crack is narrowed as the metallic carbide containing layer is expanded. And when cooled, the width of crack is restored. Even if the high temperature oxidation resistant carbonaceous molding is employed under the environments where heating and cooling are repeated, the vitreous member filled in the cracks can always fill the cracks by following the changes in the widths of cracks. Consequently, the vitreous member has the anchor effect maintained even if heating and cooling are repeated, whereby the vitreous material layer is not peeled from the metallic carbide containing layer.

And in the high temperature oxidation resistant carbonaceous molding, the vitreous material layer is formed on the surface of the metallic carbide containing layer having excellent wettability at high temperatures, whereby the surface of the metallic carbide containing layer is uniformly covered with the vitreous material layer. Accordingly, even if the high temperature oxidation resistant carbonaceous molding is exposed to the oxidizing atmosphere at high temperatures, the parent material does not contact with the atmosphere, whereby this high temperature oxidation resistant carbonaceous molding has the excellent oxidation resistance.

According to a second aspect of the present invention, there is provided a method for manufacturing a high temperature oxidation resistant carbonaceous molding comprising steps of contacting a metal penetrant containing a metal powder forming carbide, a halide and a sintering inhibitor and carbon material, heating the metal penetrant and the carbon material in a ventilating current of rare gas, and diffusing a metal deposited on a surface of the carbon material by a metallic halide gas formed by the reaction of the metal powder and the halide into the carbon material.

According to a fourth aspect of the present invention, the metallic carbide containing layer may have more than 65 wt % content ratio.

According to a fifth aspect of the present invention, the metallic carbide containing layer may have the thickness of from 10 to 50 μm.

According to a sixth aspect of the present invention, the cracks may be like wedges from a surface of the metallic carbide containing layer toward the parent material.

According to a seventh aspect of the present invention, the metal may be at least one of chromium, titanium, zirconium, hafnium, vanadium, niobium, tantalum, molybdenum, tungsten and silicon as far as the metal forms its carbide.

In the method for manufacturing the high temperature oxidation resistant carbonaceous molding, the metal penetrant is heated in a ventilating current of rare gas, whereby the deposition rate of the metal on the carbon material is slower than the conventional chromising treatment made in a ventilating current of hydrogen gas. Therefore, the percentage of metallic carbide diffused and produced into the carbon material in the deposited metal is higher than that of the conventional. According to the manufacturing method of the invention, the metallic carbide containing layer having metallic carbide at high content ratio is formed on the surface of carbon material, whereby the heat resistance of carbon material is enhanced. On the other hand, in this manufacturing method, the content ratio of the metal in the metallic carbide containing layer is lower, whereby the oxidation resistance of carbon material is increased by preventing the metal from being oxidized to make the metallic carbide containing layer porous.

According to the third aspect of the present invention, the method for manufacturing the high temperature oxidation resistant carbonaceous molding may include a step of forming a vitreous material layer on a surface of the carbon material after diffusing a metal formed by the reaction of the metal powder and the halide into the carbon material.

With this manufacturing method, the content ratio of metallic carbide in the metallic carbide containing layer is increased, as previously described, the metallic carbide containing layer is strongly bonded on the surface of carbon material due to the metallurgic reaction. Since the metallic carbide containing layer containing the metallic carbide at high content ratio has an extremely higher contraction ratio in cooling than carbon. When this carbon material is cooled to room temperatures, many cracks are formed on the surface of carbon material. And if the vitreous material layer is formed on the surface of this carbon material, vitreous material enters into the cracks, so that the vitreous material layer is strongly bonded on the surface of carbon material. Accordingly, with this manufacturing method, the durability of the high temperature oxidation resistant carbonaceous molding is remarkably enhanced.

According to a eighth aspect of the present invention, in a method for manufacturing a high temperature oxidation resistant carbonaceous molding, the halide may be at least one of ammonium chloride, ammonium fluoride and ammonium iodide.

According to a ninth aspect of the present invention, in a method for manufacturing a high temperature oxidation resistant carbonaceous molding, the sintering inhibitor may be at least one of alumina and titania.

According to a tenth aspect of the present invention, in a method for manufacturing a high temperature oxidation resistant carbonaceous molding, the rare gas may be at least one of argon, helium and neon.

According to an eleventh aspect of the present invention, in a method for manufacturing a high temperature oxidation resistant carbonaceous molding, the vitreous material layer may be at least one of sodium silicate, potassium silicate, aluminum phosphate and colloidal silica.

BRIEF DESCRIPSION OF THE DRAWINGS

DETAILED DESCRIPTION OF THE PREFFERED EMBODIMENT

The preferred embodiments of the present invention will be described below with reference to the accompanying drawings.

Figure 1:
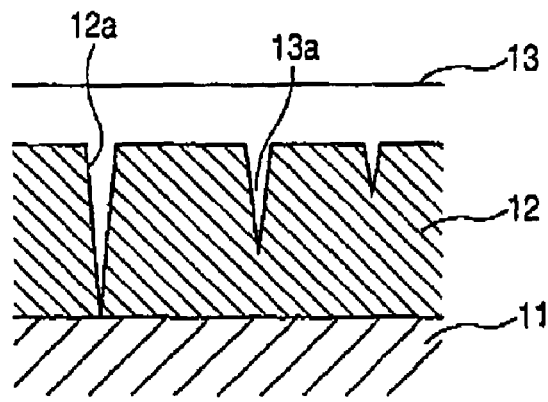
FIG. 1 is a cross-sectional view of a high temperature oxidation resistant carbonaceous molding according to an embodiment of the present invention.

FIG. 1 is a cross-sectional view of a high temperature oxidation resistant carbonaceous molding according to an embodiment of the present invention.

The high temperature oxidation resistant carbonaceous molding (hereinafter simply referred to as "molding") comprises a parent material 11 composed of carbon/carbon composite material, a metallic carbide containing layer 12 containing chromium carbide ($Cr_{23}C_6$) and formed on the parent material 11, and a vitreous material layer 13 composed of sodium silicate and formed on the surface of the metallic carbide containing layer 12, as shown in FIG. 1.

The metallic carbide containing layer 12 is formed by diffusing metal chromium (carbide formation metal) into carbon/carbon composite material, in which the metallic carbide containing layer 12 contains metal chromium and chromium carbide ($Cr_{23}C_6$), as will be described later.

The metallic carbide containing layer 12 contains chromium carbide at a content as high as 65 wt %, for example. The thickness of metallic carbide containing layer 12 may be about 10 to 50 μm.

The metallic carbide containing layer 12 is formed with a crack 12a cut like a wedge from its surface toward the patent material 11. This crack 12a is filled with vitreous material, namely, a vitreous member 13a composed of sodium silicate.

The vitreous material layer 13 is made of sodium silicate, and integrated with the vitreous member 13a. The thickness of the vitreous material layer 13 may be appropriately decided according to the use environment of molding. For example, the thickness is preferably 10 μm or less in a case where the molding is used under the dynamic environment where vibration and shock are applied, or 100 μm or less in a case where the molding is used under the static environment.

Since in this molding the vitreous member 13a filled in the crack 12a and the vitreous material layer 13 are integrated, the vitreous material layer 13 is firmly bonded onto the surface of the metallic carbide containing layer 12, owing to an anchor effect of the vitreous member 13a. Accordingly, the vitreous material layer 13 is not detached from the metallic carbide containing layer 12 by vibration or shock.

Also, in the molding, the width of the crack 12a becomes narrower as the metallic carbide containing layer 12 is expanded by heating. And when cooled, the width of the crack 12a is restored. Even if the molding is employed in the environment where heating and cooling are repeated, the vitreous member 13a filled in the crack 12a follows the changed width of the crack 12a to fill the crack 12a at any time. Consequently, even if heating and cooling are repeated, the anchor effect of the vitreous member 13a is kept, so that the vitreous material layer 13 is not desorbed from the metallic carbide containing layer 12.

And in this molding, since the vitreous material layer 13 is formed on the surface of the metallic carbide containing layer 12 having an excellent wettability at high temperatures, the surface of the metallic carbide containing layer 12 is uniformly covered with the vitreous material layer 13. Accordingly, in this molding, the parent material does not contact with the oxidizing atmosphere at high temperatures, even if exposed to the atmosphere whereby the molding has the excellent oxidation resistance.

This molding is superior in the oxidation resistance and durability when it is employed under the dynamic environment where the vibration or shock is applied at high temperature and heating and cooling are repeated, for example, an exhaust pipe or a thermal insulation board for the vehicle.

A method for manufacturing this molding will be described below.

Figure 2:
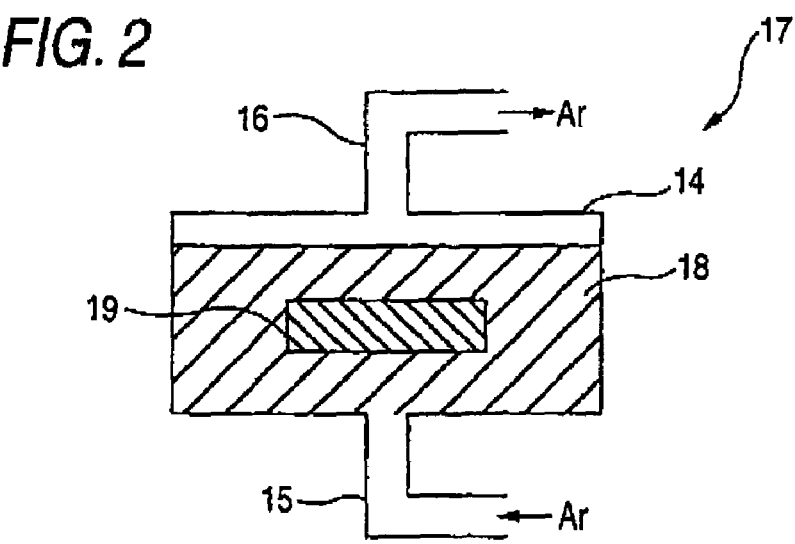
FIG. 2 is a concept view schematically showing the structure of a metal penetrating device for use with a manufacturing method for the high temperature oxidation resistant carbonaceous molding according to the present invention.
Figure 3:
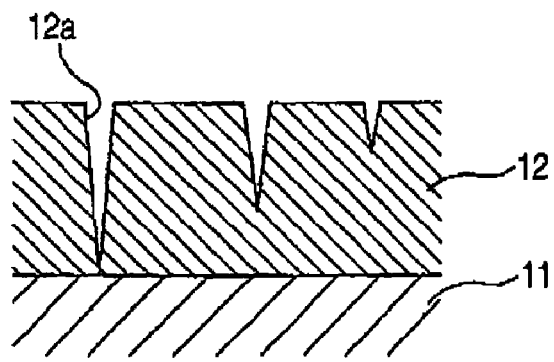
FIG. 3 is a cross-sectional view showing the cracks formed on the metallic carbide containing layer.

FIG. 2 is a concept view schematically showing the structure of a metal penetrating device for use with the method for manufacturing the molding according to the present invention. FIG. 3 is a cross-sectional view showing the cracks produced in the metallic carbide containing layer.

The method for manufacturing the molding according to the present invention uses a metallic penetrating device 17 having a sealed container 14 filled up with the metal penetrant, an inlet pipe 15 for introducing argon gas into the sealed container 14, and an exhaust pipe 16 for exhausting argon gas from the sealed container 14, as shown in FIG. 2.

With this manufacturing method, first of all, the metal penetrant 18 is filled into the sealed container 14, and a carbon/carbon composite material 19 is buried in this metal penetrant 18. The metal penetrant 18 contains metal chromium as a metal powder, ammonium chloride as halide, and alumina as the sintering inhibitor. The blending amounts may be appropriately set in a range from 19.5 to 80 wt % for metal chromium, from 0.5 to 2.0 wt % for ammonium chloride, and from 19.5 to 80 wt % for alumina.

Then, argon gas is introduced through the inlet pipe 15 into the sealed container 14, and exhausted from within the sealed container 14 through an exhaust pipe 16, so that the inside of the sealed container 14 is kept in a non-oxidizing atmosphere, and a ventilating current of argon gas is formed within the sealed container 14. And the metal penetrant 18 is heat at 900 to 1100° C. for about 10 to 30 hours, while argon gas is supplied into the sealed container 14.

With the manufacturing method of the present invention, when the metal penetrant 18 is heated and reaches a temperature of 338° C., ammonium chloride is sublimated and decomposed to produce ammonia gas and hydrogen chloride gas. Then, chromium chloride gas and hydrogen gas produced by reaction between the hydrogen chloride gas and metal chromium are repleted in the metal penetrant. And the temperature of the metal penetrant 18 reaches the above mentioned range, or a high temperature zone of 900° C. or more, chromium chloride gas is reduced by hydrogen gas. Consequently, very fine metal chromium particles are deposited on the surface of carbon/carbon composite material 19. And deposited metal chromium particles react with carbon in a process of permeating into the carbon/carbon composite material 19 to produce chromium carbide ($Cr_{23}C_6$).

In producing chromium carbide in this way, the deposition amount of metal chromium particles on the surface of the carbon/carbon composite material 19 is increased as the concentration of chromium chloride gas aomong the metal penetrant 18 is higher and the concentration of hydrogen gas is higher. And as the deposition rate of metal chromium is faster than the production rate of chromium carbide, the percentage of chromium carbide contained in the metallic carbide containing later 12 is smaller, and the percentage of metal chromium is greater. If more metal chromium is contained in the metallic carbide containing layer 12 in this way, chromium oxide produced by oxidizing metal chromium makes the metallic carbide containing layer 12 porous, so that the carbon/carbon composite material 19 has lower oxidation resistance at high temperatures.

On the other hand, in the manufacturing method of the present invention, the metal penetrant 18 is heated in the ventilating current of argon gas. And a predetermined amount of argon gas is circulated through the metal penetrant 18 to reduce and the amount of chromium chloride gas produced in the metal penetrant and the amount of hydrogen gas and to keep the amounts constant. Accordingly, the deposition rate of metal chromium is made slower than making a metal diffusing process in no oxygen state without causing the ventilating current, and is kept constant. Also, in the manufacturing method of the invention, since the chromising treatment is not performed in the ventilating current of hydrogen gas like the conventional method, the deposition rate of metal chromium can be remarkably faster than that of the conventional method. Accordingly, with the manufacturing method of the present invention, for example, chromium carbide is produced at a content ratio as high as 65 wt % or more in the metallic carbide containing layer 12.

The metallic carbide containing layer 12 containing produced chromium carbide at high content ratio is strongly bonded with the carbon/carbon composite material as the bedding owing to a metallurgical reaction. And the metallic carbide containing layer 12 containing chromium carbide at high content ratio has an extremely higher contraction ratio in cooling than the patent material 11 containing carbon as the main component. Accordingly, it the metallic carbide containing layer 12 is formed on the surface of the patent material 11 and then cooled to room temperatures, the metallic carbide containing layer 12 contracts more greatly than the parent material 11, while being joined with the parent material 11. As a result, the metallic carbide containing layer is formed with more cracks 12a extending from the surface of the metallic carbide containing layer toward the parent material 11, as shown in FIG. 3.

Next, with the manufacturing method of the present invention, the vitreous material layer 13 made of sodium silicate is formed on the surface of the metallic carbide containing layer. In forming the vitreous material layer 13, first of all, the carbon/carbon composite material is soaked in a sodium silicate solution, or the surface of the carbon/carbon composite material is coated with a sodium silicate solution, so that sodium silicate solution is applied on the surface of the carbon/carbon composite material. In this way, the sodium silicate solution permeates into the cracks 12a, and filled in the cracks 12a. When the viscosity of the sodium silicate solution used is high, decompression processing is performed to the carbon/carbon composite material on which the sodium silicate solution is applied in a vacuum vessel, so that the sodium silicate solution is fully filled in the cracks 12a.

And the carbon/carbon composite material is sintered at about 350° C., the molding of the present invention is obtained.

Next, this invention will be more specifically described using several examples.

EMBODIMENT EXAMPLE 1

To evaluate the oxidation resistance of the molding according to the present invention, the samples 1 to 4 were fabricated, using carbon material made of carbon/carbon composite material having a thickness of 2 mm, a width of 25 mm and a length of 50 mm. The density of this carbon material was $1.5/cm^3$. Measuring a flexural strength at room temperatures, its anti-flexural force was 1550 $kg/cm^2$.

Samples 1 and 2 were produced by the manufacturing method of the present invention by performing the chromising treatment for the carbon material. The metal penetrant was a uniform mixture of metal chromium powder 60 wt %, alumina powder 39.5 wt % and ammonium chloride 0.5 wt %. And this metal penetrant was filled within the sealed container 14 for the metal penetrant device (see FIG. 2), with carbon material filled in the metal penetrant, and is heated at 1100° for 10 hours, while flowing argon gas through the sealed container 14, so that a metallic carbide containing layer having a thickness from 35 to 50 μm was formed on the surface of carbon material. Many cracks 12a were formed in this metallic carbide containing layer. And analyzing this metallic carbide containing layer employing an X ray microanalyzer, it was found that the metallic carbide containing layer contained chromium carbide ($Cr_{23}C_6$) of 75 to 80 wt %.

Sample 2 was produced in the same way as sample 1, except that a vitreous material layer was further formed on the surface of the metallic carbide containing layer. This vitreous material layer was formed in such a way that carbon material performing undergone the chromising treatment was soaked in a sodium silicate solution ($SiO_2$=21.5 wt %, $Na_2O$=7.5 wt %, $H_2O$=70.5 wt % and other components=0.5 wt %), and naturally dried, then soaked again and natural dried three times repeatedly, and baked at 350° C. Examining a cross section of the sample 2 through the microscope, the vitreous material layer having a thickness of 3 to 7 μm was formed on the surface of the metallic carbide containing layer, with transparent vitreous sodium silicate filled in the cracks 12a, and integrated with the vitreous material layer. The anti-flexural force of sample 1 was 1620 $kg/cm^2$, and the anti-flexural force of sample 2 was 1625 $kg/cm^2$.

Sample 3 was produced by performing the chromising treatment for carbon material in the same way as samples 0.1 and 2, except for using the metal penetrant containing ferrochromium powder (Fe=40 wt %, Cr=60 wt %) 70 wt %, alumina powder 28 wt % and ammonium chloride powder 2.0 wt % were mixed uniformly. The metallic carbide containing layer having a thickness of 60 to 80 μm was formed on the surface of carbon material. Though cracks 12a were formed on the metallic carbide containing layer, the occurrence amount of cracks 12a was smaller than those in samples 1 and 2. Analyzing this sample 3 employing the X ray microanalyzer, the metallic carbide containing layer had an iron content of 6.5 to 9.0 wt % and the base parent material 11 had an iron content of 0.4 to 1.8 wt %. The anti-flexural force of sample 3 was 320 $kg/cm^2$.

Sample 4 was produced by performing the conventional chromising treatment for carbon material in the same way as samples 1 and 2, except for using a metal penetrant containing metal chromium powder 70 wt %, alumina powder 27 wt % and ammonium chloride 3.0 wt % were mixed uniformly and hydrogen gas instead of argon gas. The metallic carbide containing layer having a thickness of 50 to 70 μm was formed on the surface of carbon material. Though cracks 12a were formed on the metallic carbide containing layer, the occurrence amount of cracks 12a was only one-third those in samples 1 and 2. The adhesiveness between the parent material of the bedding and the metallic carbide containing layer was less excellent, so that the metallic carbide containing layer partly fell out of the parent material. Analyzing this metallic carbide containing layer employing the X ray microanalyzer, the content of chromium carbide in the metallic carbide containing layer was about 35 to 45 wt %. In this way, it is conceived that the adhesiveness of the metallic carbide containing layer was bad, and the content of chromium carbide was small owing to the possibly the influence of hydrogen gas. The anti-flexural force of sample 4 was 1075 $kg/cm^2$.

In this example, sample 5 was produced as the carbon material, namely, no treatment material. For the samples 1 to 5, the following oxidation resistant evaluation test was conducted.

In this oxidation resistant evaluation test, the samples 1 to 5 were heated at 700° C., 800° C., 900° C., 1000° C., 1100° C. and 1200° C. for four hours in the electric furnace, whereby the mass change was measured to obtain an oxidation loss ratio. The measurement results are shown in Table 1.

TABLE 1

|  |  | kind of samples (anti-flexural force) | | | | |
|  |  | embodiments of the present invention | | | comparison examples | |
|  |  | sample 1 (1620) | sample 2 (1625) | sample 3 (320) | sample 4 (1075) | sample 5 (1550) |
| --- | --- | --- | --- | --- | --- | --- |
| metal carbide containing layer | thickness (μm) | 35–50 | 35–50 | 60–80 | 50–70 | 0 |
|  | crack | many | many | few | few | none |
|  | chromium carbide content | 75–80 | 75–80 | 55–65 | 35–45 | 0 |
|  | iron content | none | none | present | none | none |

TABLE 1-continued

| | | | \multicolumn{3}{c}{embodiments of the present invention} | \multicolumn{2}{c}{comparison examples} |
| | | | sample 1 (1620) | sample 2 (1625) | sample 3 (320) | sample 4 (1075) | sample 5 (1550) |
|---|---|---|---|---|---|---|---|
| oxidation weight loss rate | heating temperature | 700 (° C.) | 0 | 0 | 0 | 3.4 | 100 |
| | | 800 (° C.) | 0 | 0 | 0 | 13.3 | 100 |
| | | 900 (° C.) | 0 | 0 | 3.5 | 46.7 | 100 |
| | | 1000 (° C.) | 0 | 0 | 16.5 | 65.0 | 100 |
| | | 1100 (° C.) | 7.6 | 0 | 35.5 | 100 | 100 |
| | | 1200 (° C.) | 26.8 | 2.6 | 76.8 | 100 | 100 |

As will be clear from. Table 1, sample 1 had no weight loss due to oxidation even at 1000° C., and sample 2 had no weight loss due to oxidation even at 1100° C. Sample 1 started to lose its weight at 1100° C., because chromium carbide of the metallic carbide containing layer was oxidized to make the metallic carbide containing layer porous, and permeable to the air. On the other hand, sample 2 had slight weight loss at 1200° C., which is presumed because the vitreous material layer prevented oxidation of chromium carbide contained in the metallic carbide containing layer.

Sample 3 had no weight loss at 800° C., had slight weight loss at 900° C., and got rid of complete burning at 1200° C. However, sample 3 lost its weight rapidly at 1000° C., which is presumed because iron content contained in the metallic oxide containing layer was oxidized to make the metallic oxide containing layer porous.

Sample 4 started to lose its weight at 700° C., rapidly lost weight at 900° due to oxidation, and was completely oxidized and burnt at 1100° C. The reason why the sample 4 is inferior in the resistant to oxidation is that the content of metallic chromium in the metallic carbide containing layer was so great that metallic chromium was oxidized to make the metallic carbide containing layer porous at low temperatures. Sample 5 was completely burnt at 700° C.

EXAMPLE 2

To evaluate the durability of the molding according to the present invention, a heat cycle test of repeating the heating and cooling was conducted. In this heat cycle test, sample 1 and sample 2 were employed. Supposing that one cycle included making the temperature up from ordinary temperature to 1000° C. over two hours, keeping these two samples at 1000° C. over two hours and cooling them to ordinary temperature in the atmosphere, three cycles were performed. And the oxidation weight loss ratio of sample 1 and sample 2 in each cycle was obtained. The measurement results are shown in Table 2.

TABLE 2

| kind | glass coating | \multicolumn{3}{c}{oxidation weight loss ratio (wt %)} |
| | | 1 cycle | 2 cycle | 3 cycle |
|---|---|---|---|---|
| sample 1 | none | 0 | 2.8 | 6.7 |
| sample 2 | present | 0 | 0 | 0 |

As will be clear from Table 2, sample 1 had weight loss in this heat cycle test, although sample 1 had no weight loss due to oxidation in the oxidation resistant evaluation text at 1000° C. in the example 1. On the contrary, sample 2 had no weight loss at the third cycle. When the sample 1 was cut away and had its section inspected by microscope, there was no change in the metallic carbide containing layer, but there were gaps in the parent material on the bedding where cracks reached. The gaps were formed because the air permeated the cracks to oxidize and burn the parent material when the cracks were repeatedly opened and closed due to expansion and contraction of the metallic carbide containing layer in a process where heating and cooling were repeated. And when the sample 2 was cut away and had its section inspected by microscope, there was no change in the vitreous member filled in the cracks and the vitreous material layer. Accordingly, it was found that the molding of the present invention was excellent in the durability.

EXAMPLE 3

Carbon material as large as 2 mm thick×25 wide×50 mm long was fabricated by burning compound material having phenol resin as the matrix at 1000° C. And this carbon material was coated with sodium silicate solution (water glass) that was used for sample 2 in the embodiment example 1, dried at 60° C. for two hours, and burnt at 250° C. for one hour, thereby fabricating a specimen A formed with vitreous material layer on the surface of carbon material, a specimen B in which carbon material was performed chromising treatment under the same conditions as the sample 1 in the example 1, and a specimen C formed with vitreous material layer on the specimen B in the same way as the specimen A.

Figure 4:
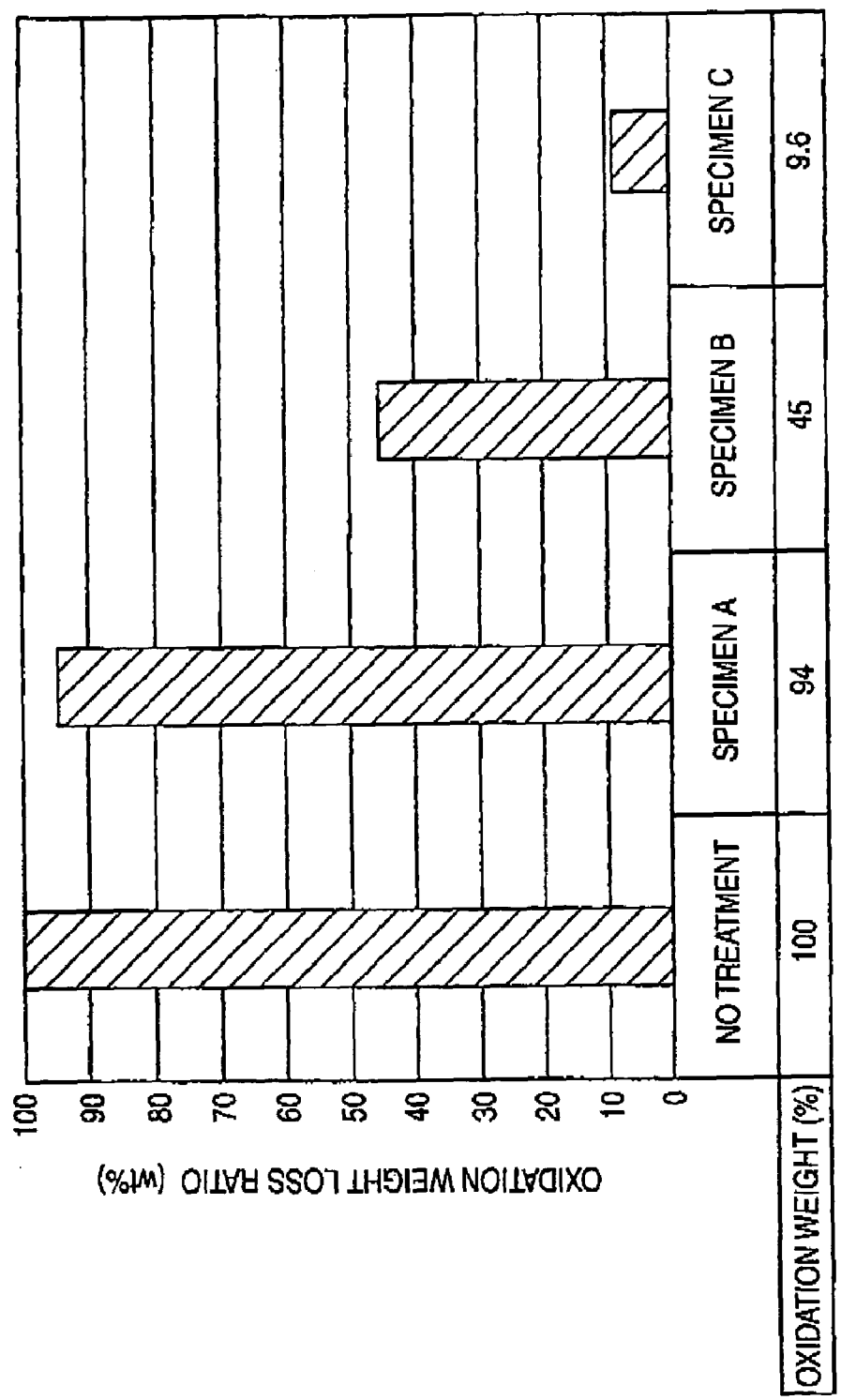
FIG. 4 is a graph showing the oxidation resistance of the high temperature oxidation resistant carbonaceous molding according to the present invention.

The carbon material and the specimens A to C were heated in the air at 850° C. for one hour, whereby their oxidation weight loss ratios were obtained. The results are shown in FIG. 4. In FIG. 4, the carbon material with "no treatment" was completely burnt through this heating treatment. Also, 94 wt % of the specimen A was burnt, 45 wt % of the specimen B was burnt, and only 9.6 wt % of the specimen C was burnt only by 9.6 wt %. As will be clear from the results, it was confirmed that the oxidation resistance was multiplically increased by combining the chromising treatment and the formation of vitreous material layer.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

In this embodiment, metal chromium was employed as a carbide formation metal. However, the present invention, instead of metal chromium, other metals which form its carbide may be employed, such as titanium, zirconium, hafnium, vanadium, niobium, tantalum, molybdenum, tungsten and silicon. Also, if such a metal is employed, titanium carbide (TiC), zirconium carbide (ZrC), hafnium carbide (HfC), vanadium carbide (VC), niobium carbide (NbC), tantalum carbide (TaC), molybdenum carbide ($Mo_2C$), tungsten carbide ($W_2C$, WC) or silicon carbide (SiC) is produced on the metallic carbide containing layer.

Also, ammonium chloride is employed as halide in this embodiment, but ammonium fluoride, ammonium iodide, or ammonium halide may be employed, instead of ammonium chloride.

Also, alumina is employed as the sintering inhibitor in this embodiment, but titania may be employed instead of alumina.

Also, argon gas is employed as the rare gas in this embodiment, but helium or neon gas nay be employed instead of argon gas.

And the specific conditions for titanising treatment to diffuse titan into the carbon material may be set such that the metal penetrant is a mixture of metal titanium powder of 29.5 to 60 wt %, titania powder of 39.5 to 70 wt %, and ammonium chloride of 0.5 to 2.0 wt %, and by heating in a ventilating current of argon gas at 900 to 1200° C. for 5 to 20 hours, the metallic carbide containing layer composed of the mixture of titanium carbide and metal titanium of thickness of 5 to 50 μm is formed on the surface of the carbon material.

Also, the specific conditions for vanadising treatment to diffuse vanadium into the carbon material may be set such that the metal penetrant is a mixture of metal vanadium powder of 29.5 to 80 wt %, alumina powder of 19.5 to 70 wt %, and ammonium chloride of 0.5 to 2.0 wt %, and by heating in a ventilating current of argon gas at 900 to 1200° C. for 5 to 20 hours, the metallic carbide containing layer composed of vanadium carbide and metal vanadium is formed 5 to 50 μm thick on the surface of carbon material.

Also, the specific conditions for siliconising treatment to diffuse silicon into the carbon material may be set such that the metal penetrant is a mixture of silicon powder of 19.5 to 60 wt %, alumina powder of 39.5 to 80 wt %, and ammonium chloride of 0.5 to 2.0 wt %, and by heating in a ventilating current of argon gas at 1600 to 1800° C. for 5 to 20 hours, the metallic carbide containing layer composed of the mixture of silicon carbide of the thickness of 5 to 50 μm is formed on the surface of carbon material.

And sodium silicate is employed as the vitreous material composing the vitreous material layer in this embodiment, but other vitreous materials may be employed as far as the vitreous material is vitrified at use temperatures of the molding. Accordingly, potassium silicate, aluminum phosphate or colloidal silica may be employed, instead of sodium silicate. Such vitreous material may be appropriately selected at use temperatures of the molding. If the use temperature of the molding is lower than 1000° C., sodium silicate and potassium silicate are preferred, or if the use temperature of the molding is from 1200 to 1500° C., a mixture of aluminum phosphate and colloidal silica is preferred.

With the high temperature oxidation resistant carbonaceous molding according to the first aspect of the present invention, the parent material is covered with the vitreous material layer via the metallic carbide containing layer, and does not contact with oxygen. Accordingly, the high temperature oxidation resistant carbonaceous molding has excellent oxidation resistance, because even if it is exposed to the oxidizing atmosphere at high temperatures, the parent material does not burn. Also, the vitreous member is filled in the cracks formed in the metallic carbide containing layer, in which the vitreous material filled in the cracks and the vitreous material layer are integrated. Accordingly, the vitreous material layer is strongly bonded on the surface of the metallic carbide containing layer due to an anchor effect of the vitreous member, so that the vitreous material layer is not peeled from the metallic carbide containing layer. Therefore, this high temperature oxidation resistant carbonaceous molding has an excellent durability.

With the method for manufacturing the high temperature oxidation resistant carbonaceous molding according to the second aspect of the present invention, the metal penetrant is heated in a ventilating current of rare gas, whereby the deposition rate of carbide formation metal on the carbon material is slower than the chromising treatment made in a ventilating current of hydrogen gas. Accordingly, in this manufacturing method, the metallic carbide is produced on the metallic carbide containing layer at high content ratio.

What is claimed is:

1. A high temperature oxidation resistant carbonaceous molding comprising:
    a parent material made of carbon material and having an exterior surface;
    a metallic carbide containing layer which is formed such that a metal is diffused to the exterior surface of the parent material and metal carbide is formed thereon and having cracks, wherein the metal is at least one of chromium, titanium, zirconium, hafnium, vanadium, niobium, tantalum, molybdenum, and tungsten;
    a vitreous member composed of a vitreous material filled in the cracks; and
    a vitreous material layer formed on a surface of the metallic carbide containing layer;
    wherein the vitreous member and the vitreous material layer are integrated and cover the exterior surface of the parent material.

2. A high temperature oxidation resistant carbonaceous molding as set forth in claim 1, wherein the metallic carbide containing layer is more than 65 wt % carbide.

3. A high temperature oxidation resistant carbonaceous molding as set forth in claim 1, wherein the metallic carbide containing layer has thickness of from 10 to 50 μm.

4. A high temperature oxidation resistant carbonaceous molding as set forth in claim 1, wherein the cracks are like wedges from a surface of the metallic carbide containing layer toward the parent material.

* * * * *